(12) United States Patent
Fruchter et al.

(10) Patent No.: US 11,882,341 B2
(45) Date of Patent: Jan. 23, 2024

(54) MEDIA CONTENT VIEW REPORTING FOR REWARD GRANTING

(71) Applicant: Synamedia Limited, Staines Upon Thames (GB)

(72) Inventors: Avi Fruchter, Neve Daniel (IL); Jonathan Abram Segal, Efrat (IL); Bayla Hirsch, Jerusalem (IL); Benjamin Thomas Samways, Dorset (GB); Ariel Luwisch, Alon Shvut (IL); Mercedes Jenifer Bouhsira, Givat Zeev (IL)

(73) Assignee: Synamedia Limited, Staines upon Thames (GB)

( * ) Notice: Subject to any disclaimer, the term of this patent is extended or adjusted under 35 U.S.C. 154(b) by 0 days.

(21) Appl. No.: 17/825,971

(22) Filed: May 26, 2022

(65) Prior Publication Data
US 2023/0388609 A1  Nov. 30, 2023

(51) Int. Cl.
*H04N 21/658* (2011.01)
*G06F 21/62* (2013.01)
*H04N 21/472* (2011.01)
*G06Q 30/0217* (2023.01)
*H04L 51/10* (2022.01)

(52) U.S. Cl.
CPC ..... *H04N 21/6582* (2013.01); *G06F 21/6209* (2013.01); *G06Q 30/0217* (2013.01); *H04L 51/10* (2013.01); *H04N 21/47217* (2013.01)

(58) Field of Classification Search
CPC .......... H04N 21/6582; H04N 21/47217; G06F 21/6209; G06Q 30/0217; H04L 51/10
See application file for complete search history.

(56) References Cited

U.S. PATENT DOCUMENTS

| | | | | |
|---|---|---|---|---|
| 5,950,172 | A | * | 9/1999 | Klingman ........... H04L 63/0428 705/27.1 |
| 2003/0023489 | A1 | * | 1/2003 | McGuire ............ G06Q 30/0257 705/14.66 |

(Continued)

OTHER PUBLICATIONS

Custos Tech, "Video Security and DRM," Retrieved from the Internet on Jun. 7, 2022: https://www.custostech.com/solutions/video-security-drm/, pp. 1-20.

*Primary Examiner* — Nicholas Augustine
(74) *Attorney, Agent, or Firm* — Fernando & Partners, LLP

(57) ABSTRACT

Techniques for media content view reporting for reward granting are described herein. In accordance with various embodiments, server(s) prepare a media content item embedded with multiple parts of a key, where the key is associated with proof of viewing the media content item at a client device during a playback session. The server(s) cause the client device to decode the media content item to obtain the multiple parts during the playback session. The server(s) also receive an indication of the client device having accumulated a set of the multiple parts as proof of viewing. The client device receives the parts embedded media content item and decodes the media content item during the playback session. The client device also extracts and accumulates the multiple parts. The client device additionally sends an indication indicating having accumulated a set of the multiple parts as proof of viewing.

20 Claims, 8 Drawing Sheets

(56) References Cited

U.S. PATENT DOCUMENTS

| | | | |
|---|---|---|---|
| 2003/0154126 A1* | 8/2003 | Gehlot | G06Q 30/0261 705/14.69 |
| 2003/0233278 A1* | 12/2003 | Marshall | G06Q 30/00 705/14.35 |
| 2006/0042483 A1* | 3/2006 | Work | H04L 67/306 101/91 |
| 2007/0143266 A1* | 6/2007 | Tang | G06F 16/951 |
| 2008/0214153 A1* | 9/2008 | Ramer | G06F 16/9537 455/414.1 |
| 2008/0235721 A1* | 9/2008 | Ismail | G06Q 30/02 725/16 |
| 2010/0063877 A1* | 3/2010 | Soroca | G06F 16/68 705/14.46 |
| 2021/0281410 A1* | 9/2021 | Hain | G06Q 20/065 |

\* cited by examiner

400

500

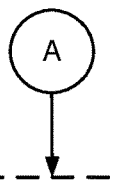

---
| The media content item is encrypted, and the method further includes ⌐560
| decrypting the media content item embedded with the multiple parts of the key
|       prior to decoding the media content item to obtain the multiple parts
---

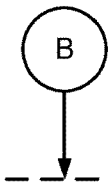

---
| Pair with a device, different from the client device, provide information to the ⌐570
| device indicating the accumulated set of the multiple parts, and cause the
| device to send an indication to a server indicating that the client device has
|       accumulated the set of the multiple parts for obtaining a reward
---

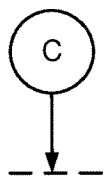

---
| A reward obtained upon sending the indication is associated with a non- ⌐580
| fungible token (NFT) or a balance of digital currency corresponding to the key
|   ---
|   | causing transferring of the NFT or the balance of digital currency to a ⌐582
|   |                            digital wallet
|   ---
---

Figure 5B

MEDIA CONTENT VIEW REPORTING FOR REWARD GRANTING

TECHNICAL FIELD

The present disclosure relates generally to multimedia content delivery and, more specifically, to reporting media content views for rewards.

BACKGROUND

The video industry suffers from media content fake views. Currently, fake views have the potential of collecting high payouts with very little investment. For example, investing in a farm of low-cost computing devices can generate millions of fake view records (e.g., faking the views of millions of videos, audios, podcasts, etc.) and each fake view record can collect a reward. The enabling factor of fake view is that many previously existing systems do not require clients to actually consume the content before reporting the view, e.g., considering a download as content consumption without verifying the actual view of the content. Such content view reporting methods are unreliable for granting rewards. Moreover, when fake views are prevalent, the business model of providing rewards for viewing targeted content is almost irrelevant, since there is no point of giving incentives to playing targeted content (e.g., advertisements) when nobody actually views the targeted content.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 5A and 5B are flow diagrams illustrating a media content view reporting method, in accordance with some embodiments.

Figure 1:
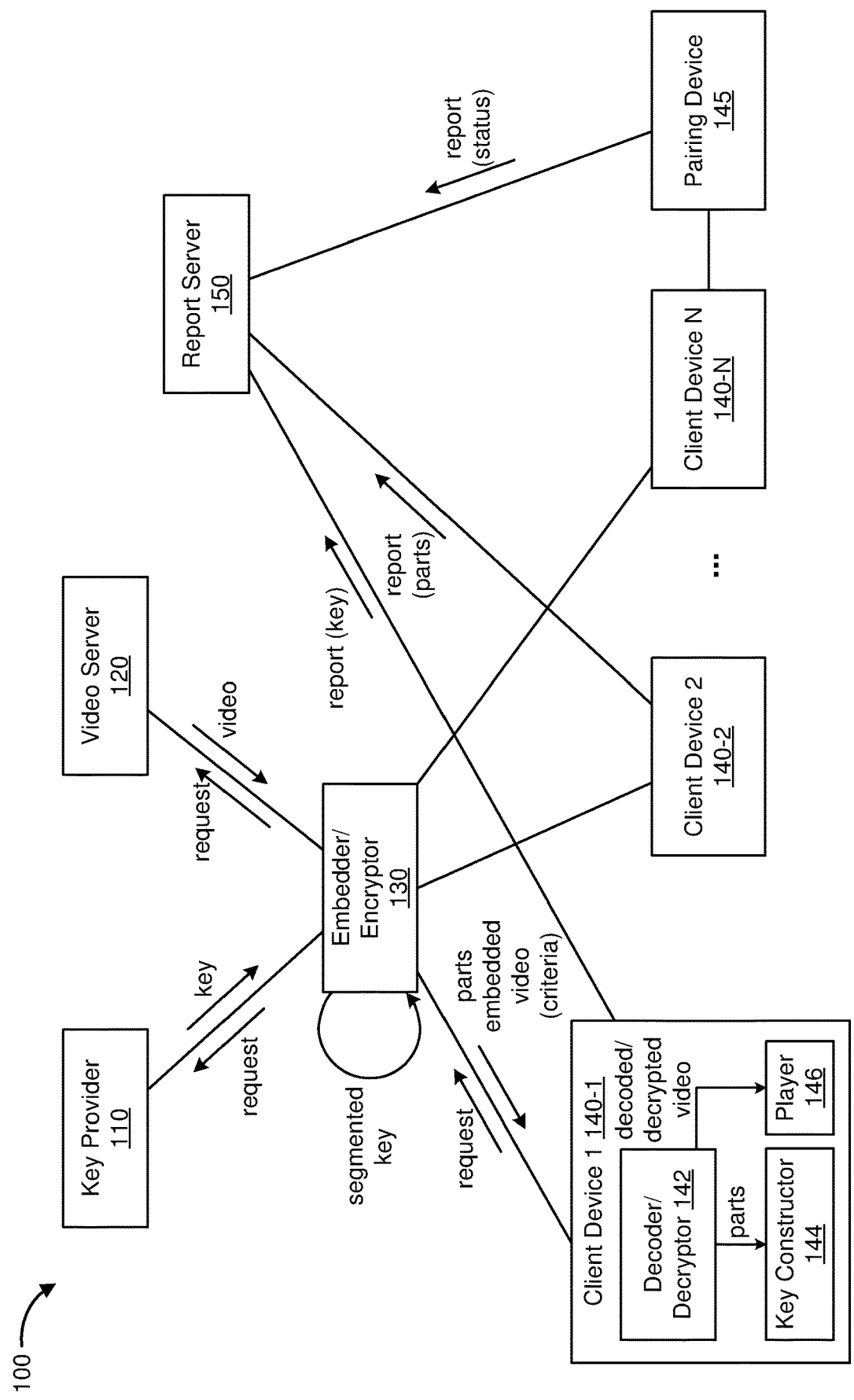
FIG. 1 is a block diagram of an exemplary media content view reporting for reward granting system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Media content view reporting techniques described herein address the aforementioned fake view issues by requiring content decoding and accumulating parts of a key that is embedded in the content to a certain degree before reporting the content view and claiming rewards. For average viewers that actually consume the content, e.g., viewing or listening to the content, the overhead of extracting parts of the key and accumulating the parts is minimal. On the other hand, because the cost of decoding is far greater than downloading, for an entity wanting to fake views, they would have to allocate decoder(s) and in many cases decryptor(s) (e.g., purchasing dedicated decoder(s), decryptor(s), and/or decoding hardware) for content consumption and sometimes even decoding the entire stream before collecting the rewards. As such, the methods, devices, and systems described herein, which require actual downloading and decoding of media content for rewards, increase the cost for fraudsters to collect the rewards, while the overhead for collecting the rewards is minimal for legitimate users using their devices for playback.

In accordance with various embodiments, a media content view reward granting method is performed at one or more devices including one or more processors and one or more non-transitory memory. The method includes preparing a media content item embedded with multiple parts of a key, where the key is associated with proof of viewing the media content item at a client device during a playback session. The method further includes causing the client device to decode the media content item to obtain the multiple parts of the key during the playback session. The method also includes receiving an indication of the client device having accumulated a set of the multiple parts. The method optionally includes facilitating granting a reward associated with the client device in response to receiving the indication.

In accordance with various embodiments, a media content view reporting method is performed at a client device including a processor and a non-transitory memory. The client device receives a media content item embedded with multiple parts of a key, where the key is associated with proof of viewing the media content item at the client device during a playback session. The client device decodes the media content item during the playback session. The client device also extracts and accumulates the multiple parts. The client device additionally sends an indication indicating having accumulated a set of the multiple parts as proof of viewing to optionally obtain a reward.

Example Embodiments

As described above, with the cost of setting up fake view farms lower than the monetary reward value for content views, it is challenging to deter fraudsters from setting up low-cost fake view farms and raking in high payouts in many previously existing systems. Currently, many systems do not require proof of the actual view for claiming rewards, e.g., considering downloading a media content item without the client device decrypting and/or decoding the content as viewing the media content item for rewards.

In accordance with some embodiments, the media content view reporting and optionally reward granting methods, devices, and systems described herein address the aforementioned issues by creating unique reward(s) for each viewing session, breaking each reward into parts, and embedding and distributing the parts over multiple sections of the requested media content item. In some embodiments, a client device decodes the data stream and extracts the parts embedded in the data stream. Upon reporting that the client device has gathered sufficient parts, in some embodiments, the client can obtain and/or redeem the reward. Because the cost of decoding is far greater than downloading, by requiring content decoding to be considered actual content viewing and eligible for collecting the reward, the media content view reporting for reward granting methods, devices, and methods described herein increase the cost of fake views, thus improving the accuracy of content view reporting, increasing the relevance of granting rewards for viewing certain content, and disincentivizing fake views.

FIG. 1 is a block diagram illustrating an exemplary media content view reporting for reward granting system 100 in accordance with some embodiments. As used herein, a reward for viewing content can be a small amount, e.g., in the form of a discount code, a free subscription code, a token, a value in digital currency, and/or a non-fungible token (NFT), etc., which can be deposited, accumulated, and/or redeemed for ad-free viewing, a free subscription, etc. As such, in various embodiments, the reward can be granted directly or indirectly to more than one party. For example, a reward can be granted to a client because the client actually viewed the content and/or granted to a service provider because an advertisement was viewed by a client in the service provider network. In some embodiments, the service provider can receive the reward associated with proof of viewing directly, e.g., directly from a transaction or ledger system upon validating proof of viewing, or indirectly, e.g., in the form of payment from the client when the client uses the reward to pay for subscription. Accordingly, a reward can be granted to the client viewing the multimedia content, the service provider providing the service of streaming content, an account owner associated with the client device used for consuming the multimedia content, both the client and the service provider, and/or split between the client(s) and the service provider, etc.

In some embodiments, the exemplary system 100 includes a key provider 110, a video server 120, an embedder and/or encryptor 130, a plurality of client devices (e.g., client device 1 140-1, client device 2 140-2, . . . , client device N 140-N, collectively referred to hereinafter as the plurality of client devices 140), and a report server 150. It should be noted that components in the exemplary system 100 can be divided, combined, and/or re-configured so that the components, sub-components, and/or combined sub-components are co-located on the same device or distributed to distinct devices. As such, any specific structure and/or function described herein is illustrative.

For example, the embedder and/or encryptor 130 can be on the same server as the key provider 110 and/or the video server 120. Alternatively, in some embodiments, the embedder and/or encryptor 130 is on an edge device to process the data streams for each client and embed the key into the data streams and/or encrypt the payload. Having the embedder and/or encryptor 130 on the edge reduces the computing cost of embedding and/or encryption. In particular, because creating a unique stream per client can be costly, as edge computing and networks evolve, an edge device including the embedder and/or encryptor 130 can be leveraged to generate unique streams so that media content items such as videos are not re-encoded for embedding the key and/or for encryption.

In some embodiments, the media content view reporting process starts with a respective client device 140 sending a request for a media content item to a server, which forwards the request to the embedder and/or encryptor 130, e.g., the respective client device 140 requesting a video, an audio file, a podcast, a live channel, etc. from a service or content provider server. In some embodiments, the request includes an identifier (ID) of the media content item, a session ID, a segment ID, an event ID, and/or a client ID. In response to receiving a respective request, in some embodiments, the embedder and/or encryptor 130 requests a key from the key provider 110 and requests the media content item from the video server 120. In some embodiments, the key provider 110, in response to receiving the request, provides a key to the embedder and/or encryptor 130, where the key is associated with a reward. Further, in some embodiments, the video server 120 sends the requested media content item such as a video, to the embedder and/or encryptor 130.

As shown in FIG. 1, in some embodiments, the embedder and/or encryptor 130 segments the key, e.g., breaking the key into multiple parts, and embeds the multiple parts of the segmented key into the media content item. The embedder and/or encryptor 130 then streams the parts of the embedded media content item to the client device 140 in accordance with some embodiments. As such, each key is associated with a unique reward and a unique data stream in accordance with various embodiments.

On the client side, in some embodiments, a respective client device 140, e.g., client device 1 140-1, includes a decoder and/or decryptor 142, a key constructor 144, and a player 146. Upon receiving the parts of the embedded media content item in the data stream, the decoder and/or decryptor 140 decodes and/or decrypts the stream during the playback session of the media content item by the player 146, and the key constructor 144 extracts the parts from the decoded and/or decrypted stream. In some embodiments, the decoder and/or decryptor 140 and the key constructor 144 can be combined or integrated, so that the decoder and/or decryptor 140 can decode and/or decrypt while extracting parts of the key and/or constructing the key. In such embodiments, a separate and distinct key constructor unit 144 becomes optional. In some embodiments, the client device 140, e.g., a client application and/or a part of the key constructor 144, further reports to the report server 150, so that the report server 150 can validate the key, mark the media content item as viewed, and/or facilitate the reward granting.

In some embodiments, the embedder and/or encryptor 130 encrypts the data stream and/or the key in preparation for transmitting the parts of the embedded media content item to the client device 140. In some embodiments, the exemplary system 100 also works on non-encrypted streams. For example, the embedder and/or encryptor 130 can package unencrypted data streams and/or unencrypted keys for streaming to the client device 140. Even without the encryption, by requiring the client devices 140 to decode the data streams and extract the key, the system 100 drives up the cost of setting up fake view farms at a large scale, thus deterring fake views.

In some embodiments, the embedder and/or encryptor 130 packages the media content item and the key using a protocol, e.g., embedding the key in the least-significant bit or using some other steganographic methods. As such, decoders on the client device 140 would have to be modified to extract the key, e.g., a secure, compliant, and/or dedicated decoder. In some embodiments, such modifications require dedicated hardware (e.g., a dedicated chip) that cannot be overcome by virtual computation. By requiring secure chip(s), a physical decoder, and/or hardware decryptor for decryption and/or decoding in order to extract the key, the media content view reporting for reward granting methods, devices, and systems described herein increase the cost of setting up fake view farms.

In some embodiments, the embedder and/or encryptor 130 also sends valid view criteria to the client device 140, e.g., inline with the media content item. In some other embodiments, the valid view criteria are shared with the report server 150. A valid view criterion can be, for example, how the key is segmented, the percentage or amount of the content to be decrypted and/or decoded for reporting and/or for collecting the reward. Examples of valid view criteria include requiring viewing a complete advertisement, a movie, and/or an event on a live channel, allowing a viewing of 50% of the video to be sufficient for claiming a view, not requiring the client to view the introduction and/or credits for claiming a view, or permitting collecting a certain percentage of the segmented parts for claiming a view, etc. In some embodiments, the valid view criteria are embedded into the media content stream, e.g., via ID3 tag in Moving Picture Experts Group (MPEG) transport stream (TS), via ID3 metadata in Event Message boxes (emsg) in MPEG-4, Common Media Application Format (CMAF), or Dynamic Adaptive Streaming (DASH) tags, or via a standard to be extracted by a decoder as part of the media content decoding. In such embodiments, the key is segmented and embedded into the stream as ID3 tags by the embedder and/or encryptor 130, and the key constructor 144 in conjunction with the decoder and/or decryptor 140 extracts and collects the tags to reconstruct the key before reporting to the report server 150.

In some embodiments, when the client device 140 reports to the report server 150, the report server 150 obtains an indication of the client device 140 having accumulated at least certain parts of the key directly or indirectly. In some embodiments, the indication is the key reconstructed by the client device, where the client device 140 reconstructs the key from at least a set of the extracted parts before sending the key to the report server 150, e.g., client device 1 140-1 reporting the reconstructed key to the report server 150. In some other embodiments, the indication includes sufficient parts of the key, where the client device 140 sends the parts to the report server 150 for validation, e.g., client device 2 140-2 sending parts of a key extracted from a data stream obtained from the embedder and/or encryptor 130 to the report server 150. In such embodiments, the report server 150 validates the parts, e.g., comparing the parts with the embedding pattern obtained from the embedder and/or encryptor 130, and determines whether sufficient parts have been reported by client device 2 140-2 to reconstruct the key for granting the reward, e.g., based on the valid view criteria obtained from the embedder and/or encryptor 130. In yet some other embodiments, the indication is sent by a pairing device 145 that is paired with client device N 140-N, e.g., a set-top-box (STB) with limited capacity and/or one-way connectivity. In such embodiments, client device N 140-N receives the parts of the embedded video from the embedder and/or encryptor 130, extracts the parts, and accumulates the parts. Further, client device N 140-N provides the status of the parts accumulation to the pairing device, e.g., through a wired connection, a wireless connection, and/or providing a QR code corresponding to the parts information. In some embodiments, the pairing device 145 obtains the status, processes the status, e.g., extracting the information from the QR code, and/or constructing the key. The pairing device 145 then reports the status and/or the key to the report server 150 for the reward.

It should be noted that components are represented in the exemplary media content reporting system 100 for illustrative purposes. Other configurations can be used and/or included in the exemplary system 100. For example, as will be described with reference to FIG. 3, the key provider 110 can include subcomponents for allocating and assigning keys. In another example, although FIG. 1 shows providing a single key in response to a request, as will be described with reference to FIGS. 2 and 3, the key provider 110 can provide multiple keys for a playback session and/or allocate a key pair in connection with a reward. In yet another example, the key provider 110, the video server 120, the embedder and/or encryptor 130, and the report 150 can be integrated, e.g., on the one or more devices that hosts multiple servers or integrating the embedder and/or encryptor 130 with the key provider 110 and/or the video server 120, or distributed, e.g., on separate devices that host distributed servers or components. Additionally, as will be shown and described in FIG. 3, in some embodiments, the exemplary system 100 can interact with an external transaction ledger for maintaining rewards, e.g., a blockchain. As such, various features of implementations described herein with reference to FIG. 1 can be embodied in a wide variety of forms, and that any specific structure and/or function described herein is illustrative.

Figure 2:
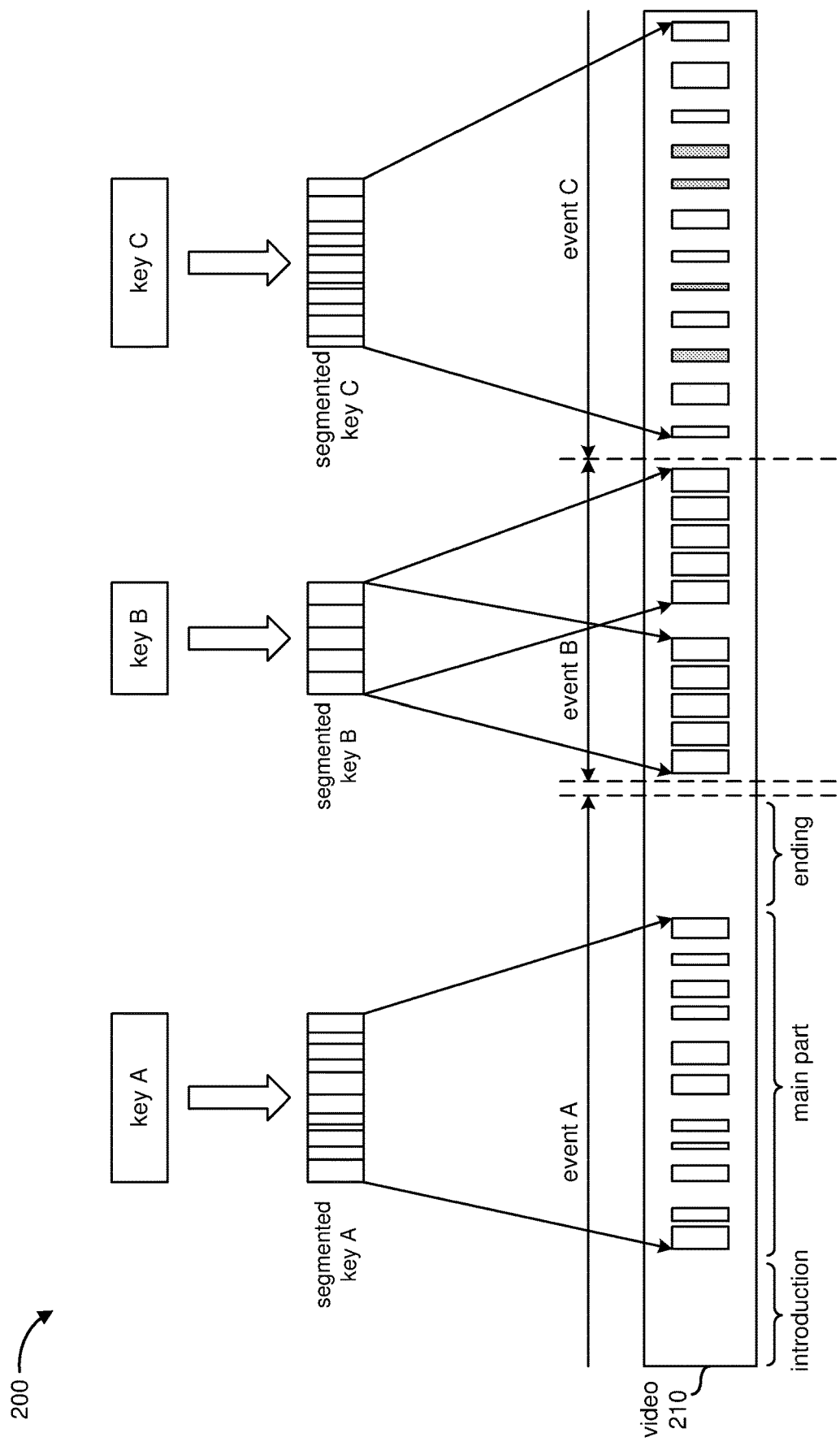
FIG. 2 is a diagram illustrating segmenting keys and embedding the segmented keys in a video, in accordance with some embodiments.

FIG. 2 is a diagram 200 illustrating segmenting keys and embedding the segmented keys in a video 210 in accordance with some embodiments. In some embodiments, a server (e.g., the key provider 110, FIG. 1) provides a unique identifier as the key for a playback session, e.g., a single ID as the key for a video-on-demand (VOD) item. In some other embodiments, as shown in FIG. 2, when the playback session includes multiple events, e.g., event A, event B, event C, etc. in the video 210, the server provides multiple keys for the multiple events, e.g., providing key A for event A, key B for event B, key C for event C, etc. An event can be, for example, an advertisement, a scene in a movie, a part of a movie, a movie, a program on a live channel, etc.

In some embodiments, at the event boundary, the server provides a new key, e.g., providing key B for event B and providing key C for event C once encountering the boundary between event B and event C. Once the embedder (e.g., the embedder and/or encryptor 130, FIG. 1) receives a respective key from the server, the embedder segments the key into smaller units, e.g., segmenting each of key A, key B, and key C into multiple parts, where the multiple parts can be the same size or of different sizes. Further, in some embodiments, the embedder embeds the smaller units into sections of the video 210. When the client views the event, e.g., viewing a complete advertisement, a movie, a part of a movie, and/or a program in a live channel, the key constructor (e.g., the key constructor 144, FIG. 1) obtains the parts from the decoder (e.g., the decoder and/or decryptor 142, FIG. 1) and constructs the key for view reporting in accordance with some embodiments.

In some embodiments, the embedder specifies valid view criteria to allow viewing a part of the media content item and/or a portion of the event for claiming the reward. In such embodiments, decrypting and/or decoding the entire media content item and/or viewing the entire duration of the event are not required for claiming the reward. For example, a valid view criterion can specify that viewing 50% of a video is sufficient for claiming the reward. In another example, as shown in FIG. 2, the embedder embeds segmented key A to section(s) of the video 210 such as the main part of event A. As such, the view does not have to view the introduction at the beginning and/or the credits in the end for claiming the reward. In still another example, as shown in FIG. 2, the valid view criterion specifies that segmented key B (or parts of segmented key B) is embedded multiple times (e.g., in a repeat pattern) and specifies the occurrences of the repeat pattern for claiming the reward, e.g., collecting at least two occurrences. In yet another example, as shown in FIG. 2, the valid view criterion allows using techniques such as Forward Error Correction (FEC) by the key constructor at the client device so that even if some portions are missed (e.g., the portions in grey), key C can be reconstructed using the remaining parts (e.g., the portions that are not in grey within event C) for claiming the reward.

It should be noted that though FIG. 2 illustrates embedding parts of a single key to each event, in some embodiments, parts of multiple keys are associated with a single event. For example, the viewer can get n number of keys for watching each few minutes of the news. In such embodiments, the multiple keys provide incentive to spend more time viewing the content, e.g., the more a user watches, the client device decodes and/or decrypts, the more keys the client device can accumulate, and the more rewards the user can get. As such, the associations among the events, the keys, and/or the video 210 can be one-to-one, one-to-many, many-to-one, or many-to-many, e.g., a single key for the video 210, a single key for an event, a single key for multiple events or videos (e.g., a key for both part 1 and part 2 of a show), or multiple keys for an event or a video.

Figure 3:
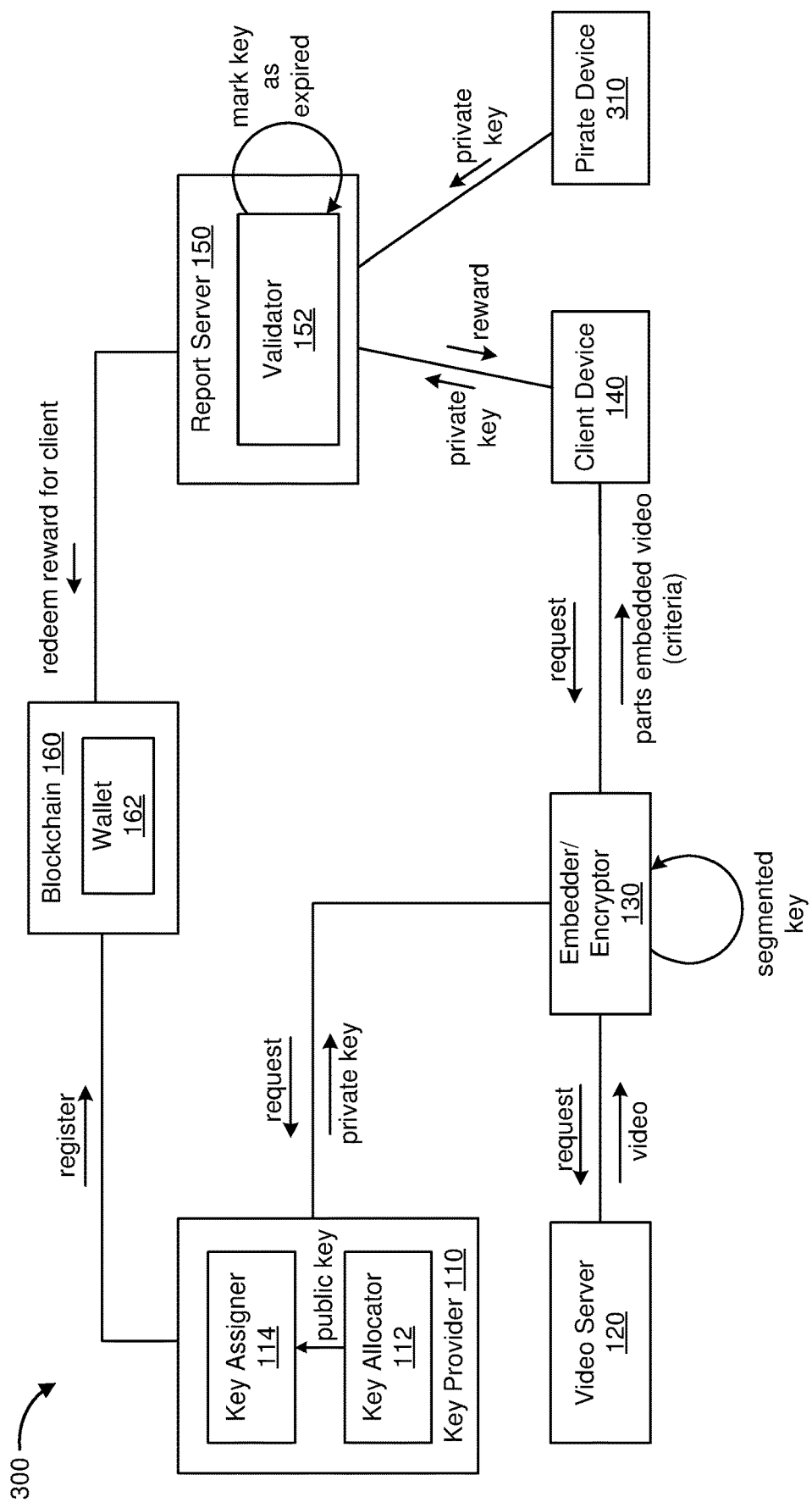
FIG. 3 is a block diagram illustrating using a blockchain for media content view reporting for reward granting, in accordance with some embodiments.

FIG. 3 is a block diagram 300 illustrating using a blockchain 160 for media content view reporting for reward granting in accordance with some embodiments. In some embodiments, the system shown in FIG. 3 is adapted from the exemplary system 100 shown in FIG. 1. As described above with reference to FIG. 1, when the client device 140 sends to the embedder and/or encryptor 130 a request to playback a media content item, the embedder and/or encryptor 130 requests a key from the key provider 110 and requests the media content item from the video server 120 in accordance with some embodiments. Further, as described above with reference to FIG. 2, in some embodiments, the request is associated with a playback session ID and/or an event ID, so that the embedder and/or encryptor 130 segments the key from the key provider 110 and embeds in the media content item and/or the event within the media content item. In some embodiments, the key provider 110 includes a key allocator 112 and a key assigner 114. In some embodiments, the key allocator 112 creates a single-use key pair associated with a unique reward, e.g., a public key and a private key. Once created, in some embodiments, the public key is registered with the key assigner 114 as the owner of the reward with a redeemable value, e.g., associating the public key with the reward for viewing the content in the playback session, and the key provider 110 sends the private key to the embedder and/or encryptor 130.

In some embodiments, the key provider 110 maintains a mapping among the reward, the public and/or private key, and the media content item ID, the session ID, the client ID, and/or the event ID. When the client device 140 reports the key associated with the reward to the reporting server 150, the reporting server 150 uses the mapping to validate the key and/or the unique ID for granting the reward. In some other embodiments, instead of assigning and maintaining the mapping, the key assigner 114 utilizes a ledger system (e.g., the blockchain 160) to facilitate the association of the key and the reward. For example, the public key can be an ID uniquely associated with an address of a reward in the blockchain, e.g., an address of an NFT or a balance of digital currency. Once the key assigner 114 registers the public key with the blockchain 160, the public key corresponds to an address of a reward in the blockchain, e.g., an address of an NFT or a balance of digital currency, thus becoming the owner of the NFT or the native coin on the blockchain 160 with a redeemable value. The key provider 110 then sends to the embedder and/or encryptor 130 the private key, which represents the value of the reward.

As described above, in some embodiments, the embedder and/or encryptor 130 segments the private key and splits up the private key into multiple parts before embedding the parts into the data stream. To recover the private key for the reward, the client device 140 collects sufficient data according to the valid view criteria, e.g., decoding, decrypting, and/or collecting the parts embedded in the main part of event A, collecting the parts in the repeated pattern embedded in event B, or collecting a set of the parts embedded in event C as shown in FIG. 2.

In some embodiments, the report server 150 includes a validator 152 to validate the private key. For example, in the case of the private key being constructed by the client device 140, the validator 152 validates whether or not the private key received can be verified using the corresponding public key. In some embodiments, the validator 152 validates whether or not the private key has been used and indicates the private key as invalid and the client is not eligible for redeeming the reward in response to finding the private being invalid. In some embodiments, as described above, instead of constructing the key, the client device 140 sends the parts to the report server 150. In such embodiments, also as described above, the report server 150 validates the parts based on the valid view criteria in addition to constructing the private key from the parts and validating the private key using the corresponding public key.

Upon successful validation, the report server 150 facilitates the reward granting to the client device 140. For example, as shown in FIG. 3, the report server 150 can send a reward notice to the client device 140. In addition, in some embodiments, the report server 150 sends a token to the client device 140 for storage so that the client device 140 can use the token (e.g., a coupon code) for redeeming a free subscription and/or free advertisements, etc. In another example, as shown in FIG. 3, the report server 150 sends the reward to the blockchain 160 so the NFT and/or the digital currency value are transferred to the viewer's wallet 162. In some embodiments, upon successful validation, notification, and/or reward granting, the validator 152 invalidates the private key, e.g., marking it as expired, so that it cannot be re-used to collect the reward.

Though not shown in FIG. 3, as described above with reference to FIG. 1, in some embodiments, the report server 150 facilitates the reward granting associated with proof of viewing to multiple parties. For example, the wallet 162 can be the viewer's wallet or associated with an account of a server provider, so that once proof of viewing is validated by the report server 150, the service provider can receive a reward for providing the content to a viewer in its service network. In another example, the report server 150 can facilitates the reward granting such that once proof of viewing is validated, a fraction of the reward is deposited to the service provider's account and the remaining portion of the reward is granted to the viewer.

It should be noted that in some embodiments, when using the blockchain 160, the report server 150 is optional. For example, the blockchain 160 can include smart contracts so that when the key and/or parts of the key are sent to the blockchain 160 directly from the client device 140, the smart contract(s) can validate the key and/or the parts and/or update the expiration of the key according to agreements among various parties. As such, in some embodiments, the validator 152 is located in the blockchain 160, e.g., in the form of smart contract(s) and the client device 140 can directly make the transfer of the reward to the wallet 162 on the blockchain 160.

As shown in FIG. 3, because the key provider 110 allocates a single-use key pair for the reward, the methods, devices, and systems described herein allow a client to watch the media content item and get rewarded but do not grant rewards to reporting a re-distributed private key. As such, once the client at the client device 140 collects the reward from the report server 150, the private key loses its value and cannot be re-used for collecting the reward. For example, in the case of a fraudster using a pirate device 310 to steal the private key or redistribute the content embedded with the private key and send the private key to the report server 150, the validator 152, which has already invalidated the private key after the client device 140 redeemed the reward, would not send the reward and/or the reward notice to the pirate device 310. As such, the system 300 has the additional advantage of incentivizing clients to view original content that has the original content embedded with the key associated with the reward rather than watching the re-distributed and/or pirated content for which they can no longer be rewarded.

Figure 4A:
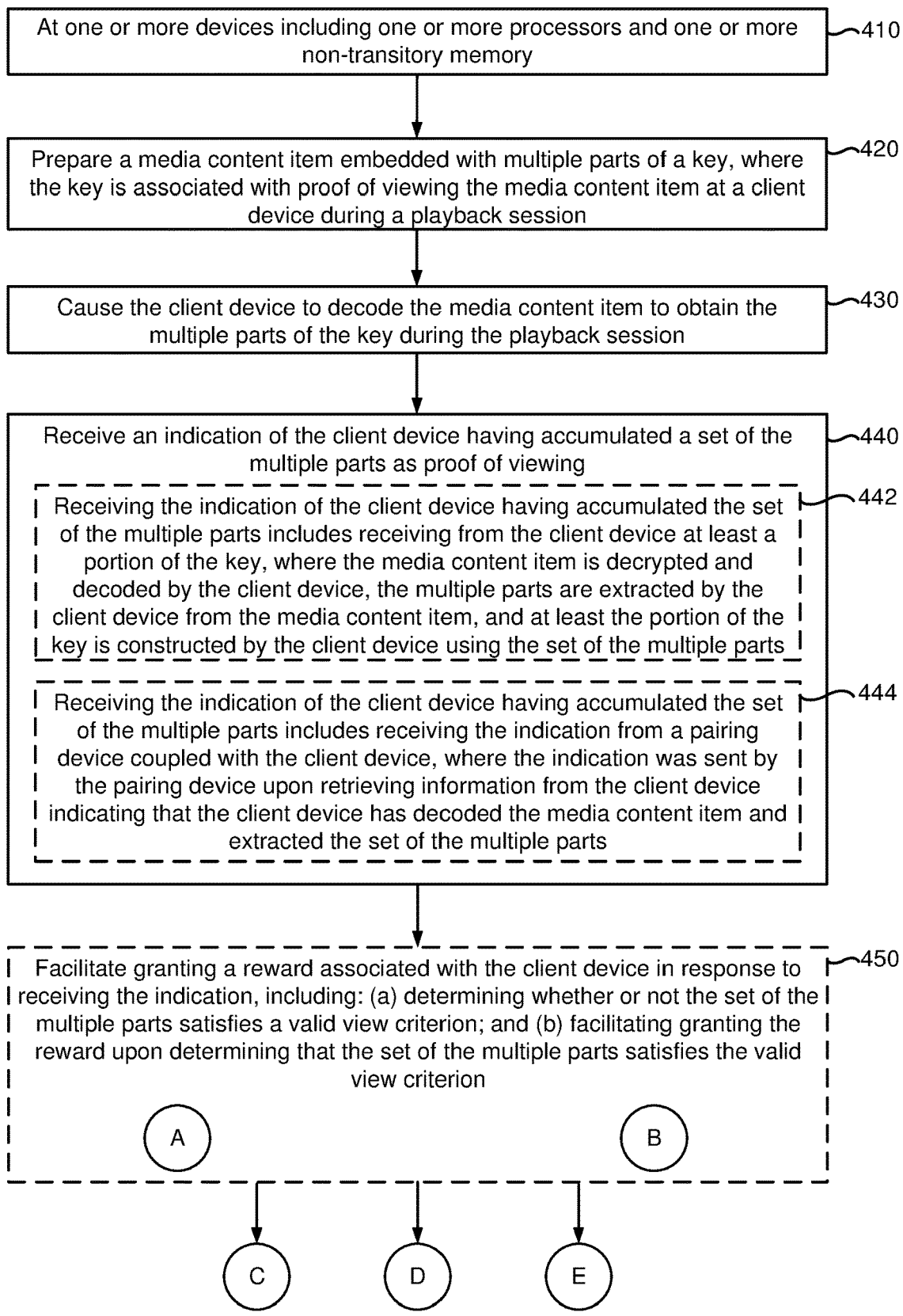
FIGS. 4A and 4B are flow diagrams illustrating a media content view reward granting method, in accordance with some embodiments.
Figure 4B:
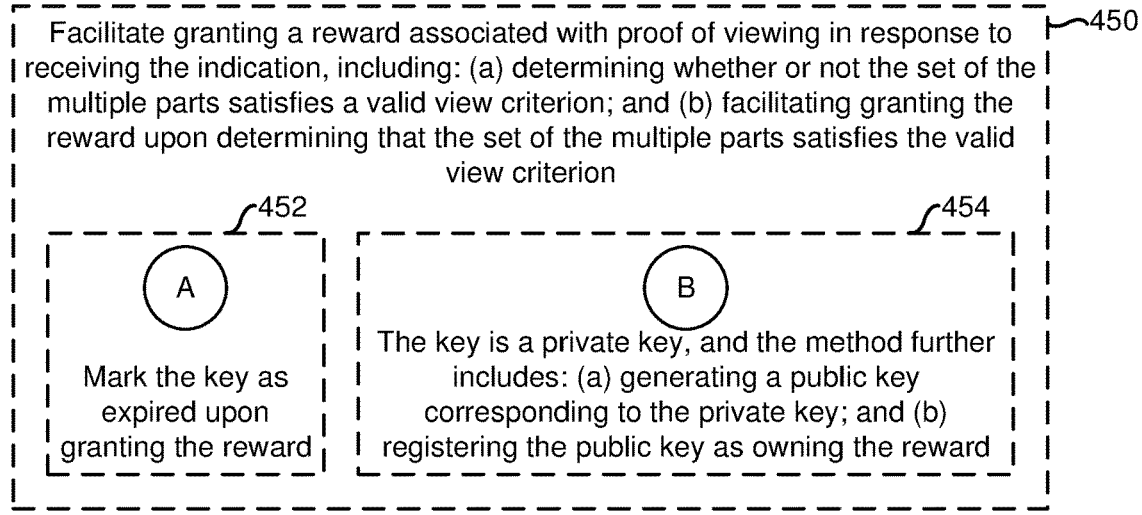
Figure 4B:
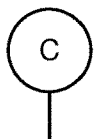
Figure 4B:
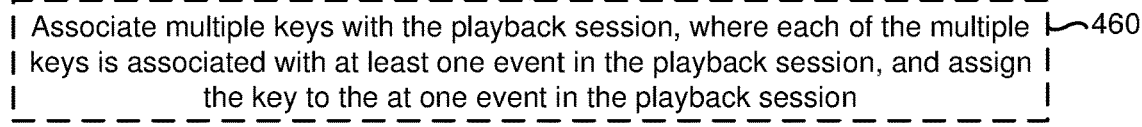
Figure 4B:
Figure 4B:
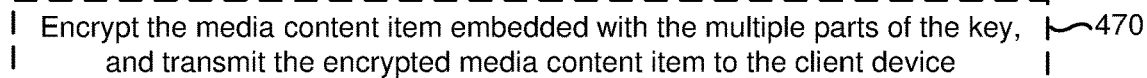
Figure 4B:
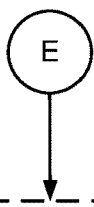
Figure 4B:
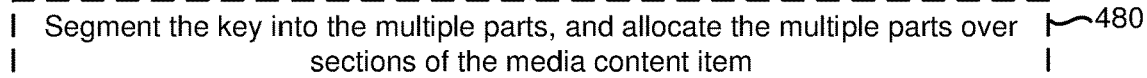

FIGS. 4A and 4B are flow diagrams illustrating a media content view reporting for reward granting method 400 in accordance with some embodiments. As represented by block 410 in FIG. 4A, in some embodiments, the method 400 is performed at one or more devices that include one or more processors and one or more non-transitory memory, e.g., the server(s) hosting the key provider 110, the video server 120, the embedder and/or encryptor 130, and/or the report server 150 in FIG. 1.

As represented by block 420, the method 400 begins with the server(s) preparing a media content item (e.g., a movie, an advertisement, a live event, etc.) embedded with multiple parts of a key, where the key is associated with proof of viewing the media content item at a client device during a playback session. For example, the key can be a value token, a unique ID corresponding to the data stream, etc., and as shown in FIG. 2, the key can be segmented into multiple parts, e.g., splitting into smaller units.

As represented by block 430, the method 400 continues with the server(s) causing the client device to decode the media content item to obtain the multiple parts of the key during the playback session, e.g., decoding the parts of the embedded video by the decoder and/or decryptor 142 in FIG. 1. As represented by block 440, the method 400 also includes receiving an indication of the client device having accumulated a set of the multiple parts as proof of viewing. In some embodiments, as represented by block 442, receiving the indication of the client device having accumulated the set of the multiple parts includes receiving from the client device at least a portion of the key, where the media content item is decrypted and decoded by the client device, the multiple parts are extracted by the client device from the media content item, and at least the portion of the key is constructed by the client device using the set of the multiple parts. For example, in FIG. 1, the report server 150 receives at least a portion of the key from client device 1 140-1. Also shown in FIG. 1, the decoder and/or decryptor 142 on client device 1 140-1 decodes the parts of the embedded video so that the player 146 can play the video. Additionally, as shown in FIG. 1, the key assigner 114 along with the decoder and/or decryptor 142 obtains parts of the key and constructs at least a portion of the key so that client device 1 140-1 can report to the report server 150.

In some embodiments, as represented by block 444, receiving the indication of the client device having accumulated the set of the multiple parts includes receiving the indication from a pairing device coupled with the client device, where the indication was sent by the pairing device upon retrieving information from the client device indicating that the client device has decoded the media content item and extracted the set of the multiple parts. For example, in FIG. 1, client device N 140-N is coupled with the pairing device 145, e.g., through a wired connection, a wireless connection, or simply scanning information displayed on client device N 140-N. In such embodiments, as shown in FIG. 1, the pairing device 145 reports to the report server 150 indicating that client device N 140-N has accumulated sufficient parts of the key to redeem the reward.

Still referring to FIG. 4A, in some embodiments, as represented by block 450, the method 400 further includes the server(s) (e.g., the report server 150, FIGS. 1 and 3) facilitating granting a reward associated with proof of viewing in response to receiving the indication, including: (a) determining whether or not the set of the multiple parts satisfies a valid view criterion; and (b) granting the reward upon determining that the set of the multiple parts satisfies the valid view criterion. For example, as shown in FIG. 3, once the client device 140 constructs the key and reports to the report server 150, the validator 152 on the report server 150 validates the key. Such valid view criterion can be, for example, whether allowing viewing a portion to be eligible for claiming the reward, e.g., the main part of event A as shown in FIG. 2 or 50% of a video. Turning to FIG. 4b, in such embodiments, as represented by block 452, the method 400 further includes marking the key as expired upon granting the reward in accordance with some embodiments. For example, in FIG. 3, once the validator 152 validates the key and grants the reward, the validator 152 marks the key as expired so that it can no longer be reported, e.g., by a fraudster at the pirate device 310. Further in such embodiments, as represented by block 454, when the key is a private key, the method 400 further includes generating a public key corresponding to the private key, and registering the public key as owning the reward. For example, in FIG. 3, the key assigner 114 registers the public key with the blockchain 160 as the owner of an NFT and/or a balance of digital currency corresponding to the public key.

Still referring to FIG. 4B, in some embodiments, as represented by block 460, the method 400 further includes associating multiple keys with the playback session, where each of the multiple keys is associated with at least one event in the playback session, and assigning the at least one key to a respective event in the playback session. For example, as shown in FIG. 2, when a client is in a playback session of a video, the key provider provides a unique key for each event in the playback session, e.g., key A for event A, key B for event B, key C for event C.

In some embodiments, as represented by block 470, the method 400 further includes encrypting the media content item embedded with the multiple parts of the key, and transmitting the encrypted media content item to the client device. For example, in FIG. 1, the embedder and/or encryptor 130 can encrypt the parts of the embedded video before sending to the client device 140.

In some embodiments, as represented by block 480, the method 400 further includes segmenting the key into the multiple parts, and allocating the multiple parts over sections of the media content item. For example, in FIG. 2, each of key A, key B, and key C is segmented into multiple parts. Also as shown in FIG. 2, the multiple parts of key A are embedded into the main part of event A, and the multiple parts of key B are embedded into event B in a repeating pattern.

Figure 5A:
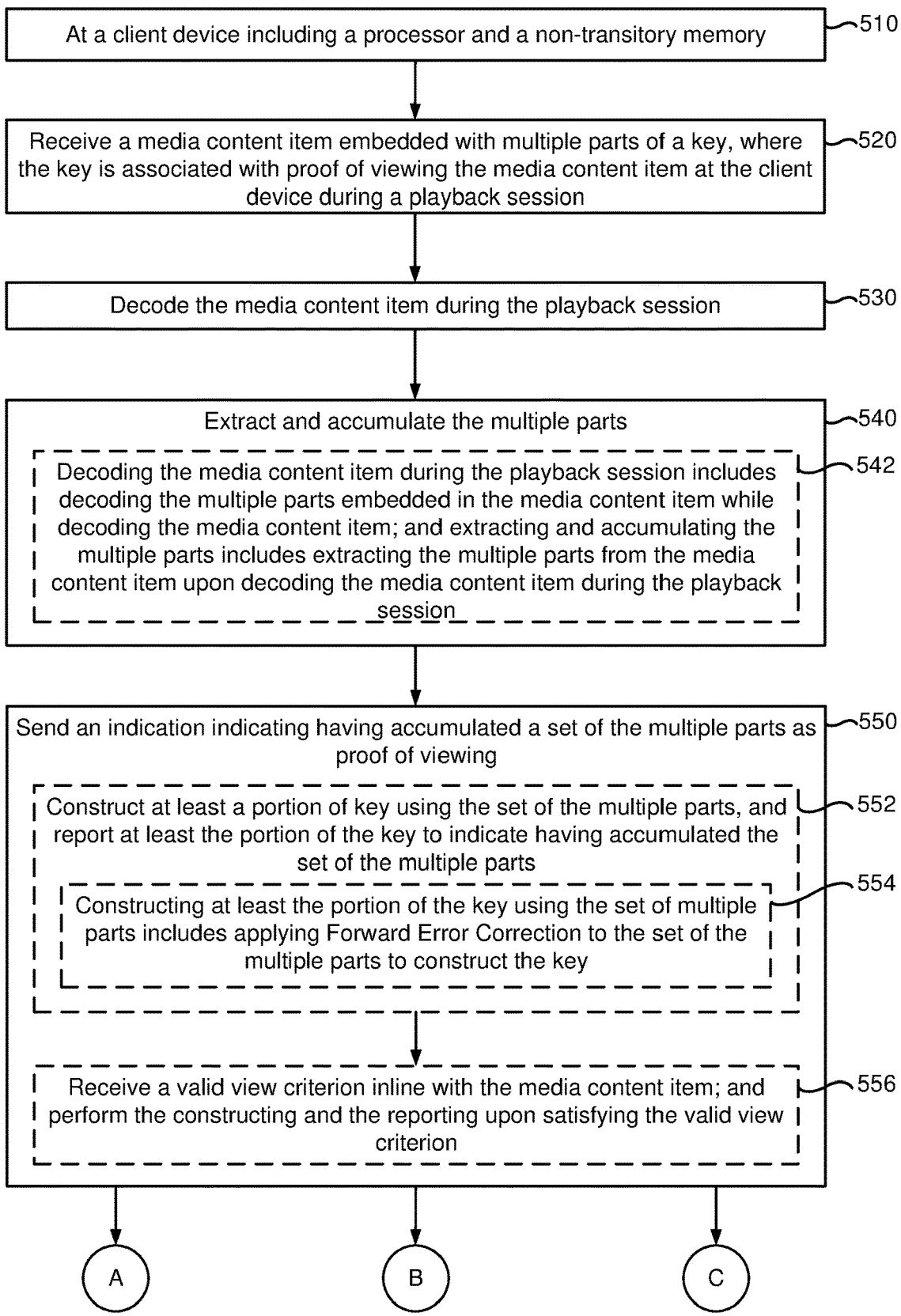

FIGS. 5A and 5B are flow diagrams illustrating a media content view reporting method 500 in accordance with some embodiments. As represented by block 510 in Figure in some embodiments, the method 500 is performed at a client device that includes a processor and a non-transitory memory, e.g., the client device 140 in FIGS. 1 and 3 that includes a processor for performing the functions of the decoder and/or decryptor 142, the key constructor 144, and/or the player 146 in FIG. 1.

The method 500 begins with the client device receiving a media content item embedded with multiple parts of a key, where the key is associated with proof of viewing the media content item at the client device during a playback session, as represented by block 520. For example, in FIG. 1, each of client device 1 140-1, client device 2 140-2, and client device N 140-N receives parts embedded sections of a media content item. The method 500 continues with the client device decoding (e.g., by the decoder and/or decryptor 142, FIG. 1) the media content item during the playback session, as represented by block 530. As represented by block 540, the method 500 further includes extracting and accumulating the multiple parts (e.g., by the key constructor 144, FIG. 1).

In some embodiments, as represented by block 542, decoding the media content item during the playback session includes decoding the multiple parts embedded in the media content item while decoding the media content item; and extracting and accumulating the multiple parts includes extracting the multiple parts from the media content item upon decoding the media content item during the playback session. As such, for a client that is viewing the video, the computational overhead is minimal, e.g., the extra computational cost to extract the parts of the key in the media content steam is minimal since the rendering requires the client device to decode and/or decrypt the media content item. In contrast, because of the requirement of decoding the media content item for view reporting, the cost of fake views increases.

The method 500 continues, as represented by block 550, with the client device sending an indication indicating having accumulated a set of the multiple parts as proof of viewing. In some embodiments, as represented by block 552, sending the indication indicating having accumulated the set of the multiple parts as proof of viewing includes constructing at least a portion of the key using the set of the multiple parts, and reporting at least the portion of the key to indicate having accumulated the set of the multiple parts. For example, a client application implementing the key constructor 144 in FIG. 1 extracts the parts of the key while the decoder and/or decryptor 142 in FIG. 1 decodes and/or decrypts the media content item and reconstructs the key before reporting the reconstructed key to the report server 150 in FIG. 1. Further, in some embodiments, as represented by block 554, constructing at least the portion of the key using the set of multiple parts includes applying Forward Error Correction to the set of the multiple parts to construct the key. For example, in FIG. 2, the client device can use a form of Forward Error Correction so that even if some of parts of key B were missed, key B can be regenerated and reported. Additionally, in some embodiments, as represented by block 556, the method 500 further includes receiving a valid view criterion inline with the media content item, and performing the constructing and the reporting upon satisfying the valid view criterion. For example, in FIG. 1, the valid view criterion sent to client device 1 140-1 can specify the percentage of the content to be decrypted, decoded, and/or constructed before reporting to the report server 150, and the valid view criterion can be embedded inline with the media content item via ID3 or emsg tags.

Turning to FIG. 5B, in some embodiments, as represented by block 560, when the media content item is encrypted, and the method 500 further includes decrypting the media content item embedded with the multiple parts of the key prior to decoding the media content item to obtain the multiple parts. As such, the media content view reporting process described herein requires a client to decrypt and decode the media content in order to collect the parts of the key and construct the complete key.

In some embodiments, as represented by block 570, the method 500 further includes pairing with a device, different from the client device, providing information to the device indicating the accumulated set of the multiple parts, and causing the device to send an indication to a server indicating that the client device has accumulated the set of the multiple parts for obtaining a reward. For example, in FIG. 1, the pairing device 145 can connect to client device 140-N via a wired or wireless connection or scan a QR code to obtain the status of the parts accumulated and send to the report server 150 to report the status as the indication that client device N 140-N has accumulated sufficient parts to redeem the reward.

In some embodiment, as represented by block 580, the reward obtained upon sending the indication is associated with a non-fungible token (NFT) or a balance of digital currency corresponding to the key. Further, as represented by block 582, in such embodiments, the method 400 further includes causing transferring of the NFT or the balance of digital currency to a digital wallet. For example, in FIG. 3, the key assigner 114 registers with the blockchain 160 the public key associated with the NFT or the balance of digital currency. Further as shown in FIG. 3, once the client device 140 constructs the corresponding private key and reports to the report server 150 (or the blockchain 160), the report server 150 (or the smart contract on the blockchain 160) validates the private key and the reward in the form of the NFT or the balance of digital currency is transferred to the wallet 162.

Figure 6:
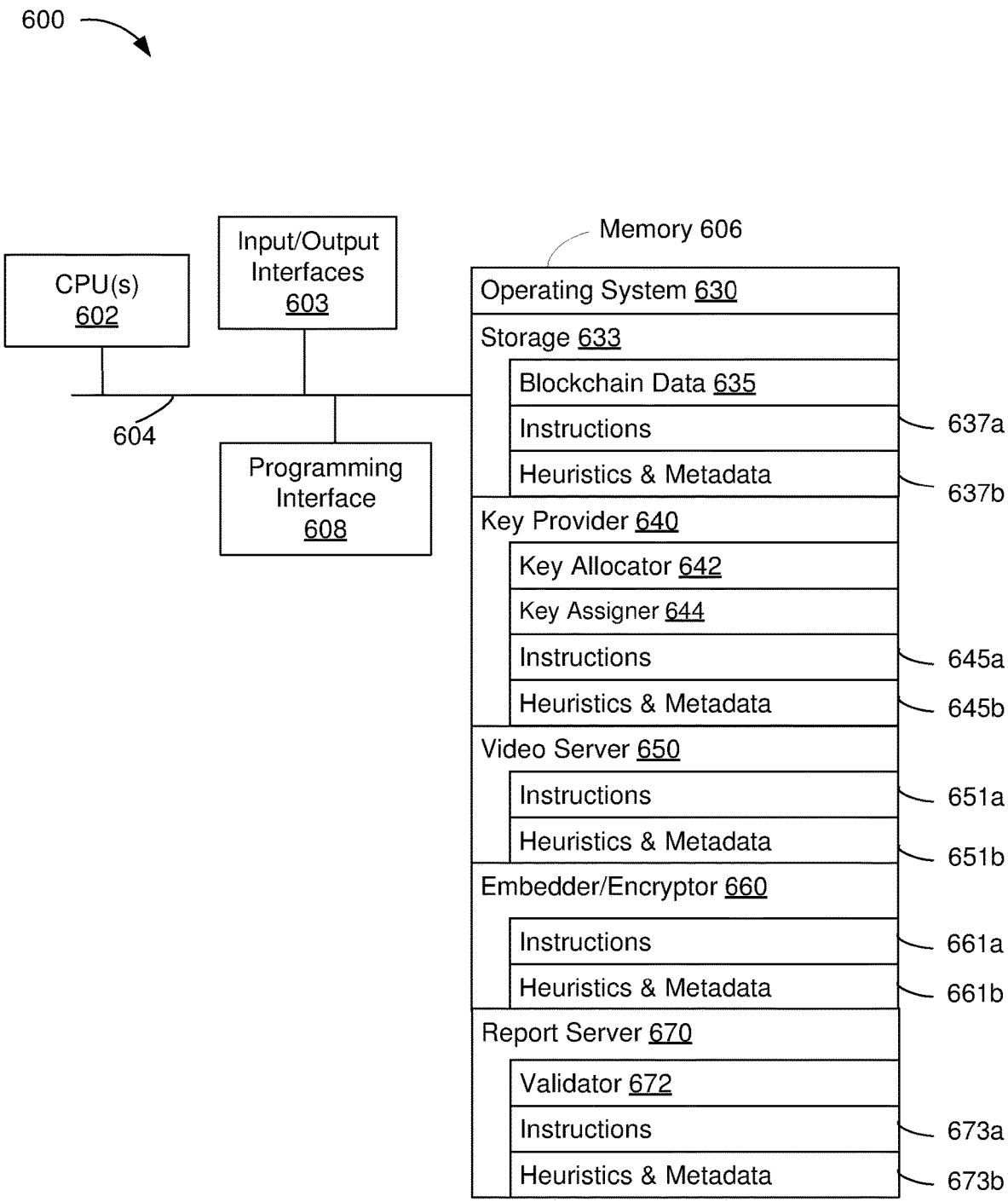
FIG. 6 is a block diagram of a computing device for preparing and embedding parts of keys to enable media content view reporting, in accordance with some embodiments.

FIG. 6 is a block diagram of a computing device 600 for preparing and embedding parts of keys to enable media content view reporting in accordance with some embodiments. In some embodiments, the computing device 600 performs one or more functions of a device (e.g., one or more servers) hosting the key provider 110 (FIG. 1), the video server 120 (FIG. 1), the embedder and/or encryptor 130 (FIG. 1), and/or the report server 150 and performs one or more of the functionalities described above with respect to the server(s). While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPUs) 602 (e.g., processors), one or more input/output interfaces 603 (e.g., input devices, sensors, a network interface, a display, etc.), a memory 606, a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a storage module 633, a key provider 640, a video server 650, an embedder and/or encryptor 660, and a report server 670. In some embodiments, one or more instructions are included in a combination of logic and non-transitory memory. The operating system 630 includes procedures for handling various basic system services and for performing hardware dependent tasks.

In some embodiments, the storage module 633 stores multimedia content, keys, and/or parts of the keys to be embedded in the multimedia content. In some embodiments, the storage 633 also stores distributed blockchain data 635, e.g., data for the blockchain 160 and/or the wallet 162 in FIG. 3. To that end, the storage module 633 includes a set of instructions 637*a* and heuristics and metadata 637*b*.

In some embodiments, the key provider 640 (e.g., the key provider 110 in FIGS. 1 and 3) is configured to provide the keys for proof of viewing. In some embodiments, the key provider 640 further includes a key allocator 642 (e.g., the key allocator 112, FIG. 1) for allocating keys to be embedded in the multimedia content for proof of viewing and a key assigner 644 (e.g., the key assigner 114, FIG. 3) for assigning respective keys as owners of rewards. To that end, the key provider 640 includes a set of instructions 645*a* and heuristics and metadata 645*b*.

In some embodiments, the video server 650 (e.g., the video server 120 in FIGS. 1 and 3) is configured to provide multimedia content. To that end, the video server 650 includes a set of instructions 651*a* and heuristics and metadata 651*b*.

In some embodiments, the embedder and/or encryptor 660 (e.g., the embedder and/or encryptor 130, FIGS. 1 and 3) is configured to segment keys and embed and/or encrypt the parts embedded multimedia content. To that end, the embedder and/or encryptor 660 includes a set of instructions 661*a* and heuristics and metadata 661*b*.

In some embodiments, the report server 670 (e.g., the report server 150, FIGS. 1 and 3) is configured to receive reported keys and/or parts from client devices as proof of viewing and facilitate granting rewards. In some embodiments, the report server 670 includes a validator 672 (e.g., the validator 152, FIG. 3) to validate the reported keys and/or parts and determines whether to grant the rewards. To that end, the report server 670 includes a set of instructions 673*a* and heuristics and metadata 673*b*.

Although the storage module 633, the key provider 640, the video server 650, the embedder and/or encryptor 660, and the report server 670 are illustrated as residing on a single computing device 600, it should be understood that in other embodiments, any combination of the storage module 633, the key provider 640, the video server 650, the embedder and/or encryptor 660, and the report server 670. For example, in some embodiments, each of the storage module 633, the key provider 640, the video server 650, the embedder and/or encryptor 660, and the report server 670 resides on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at one or more devices including one or more processors and one or more non-transitory memory:
preparing a media content stream embedded with multiple parts of a key, including encoding the media content stream and embedding the multiple parts of the key in sections of the encoded media content stream, wherein the key is associated with proof of viewing the media content stream at a client device during a playback session of the media content stream;
causing the client device to decode the media content stream, including causing the client device to decode the sections in order to play the media content stream during the playback session and obtain the multiple parts of the key from the sections; and
receiving an indication of the client device having accumulated a set of the multiple parts as proof of viewing.

2. The method of claim 1, wherein receiving the indication of the client device having accumulated the set of the multiple parts includes:
receiving from the client device at least a portion of the key, wherein the media content stream is decrypted and decoded by the client device, the multiple parts are extracted by the client device from the media content stream, and at least the portion of the key is constructed by the client device using the set of the multiple parts.

3. The method of claim 1, wherein receiving the indication of the client device having accumulated the set of the multiple parts includes:
receiving the indication from a pairing device coupled with the client device, wherein the indication was sent by the pairing device upon retrieving information from the client device indicating that the client device has decoded the media content stream and extracted the set of the multiple parts.

4. The method of claim 1, further comprising facilitating granting a reward associated with proof of viewing in response to receiving the indication, including:
determining whether or not the set of the multiple parts satisfies a valid view criterion; and
facilitating granting the reward upon determining that the set of the multiple parts satisfies the valid view criterion.

5. The method of claim 4, further comprising:
marking the key as expired upon granting the reward.

6. The method of claim 4, wherein the key is a private key, and the method further includes:
generating a public key corresponding to the private key; and
registering the public key as owning the reward.

7. The method of claim 1, further comprising:
associating multiple keys with the playback session, wherein each of the multiple keys is associated with at least one event in the playback session;
assigning the key to the at least one event in the playback session.

8. The method of claim 1, further comprising:
encrypting the media content item stream embedded with the multiple parts of the key; and
transmitting the encrypted media content item stream to the client device.

9. The method of claim 1, further comprising:
segmenting the key into the multiple parts; and
allocating the multiple parts over sections of the media content item stream.

10. A method comprising:
at a client device including a processor and a non-transitory memory:
receiving a media content stream embedded with multiple parts of a key, wherein the key is associated with proof of viewing the media content stream at the client device during a playback session of the media content stream, and the media content stream is encoded with the multiple parts of the key embedded in sections of the encoded media content stream;
decoding the media content stream during the playback session, including decoding the sections in order to play the media content stream during the playback session;
extracting and accumulating the multiple parts from the sections; and
sending an indication indicating having accumulated a set of the multiple parts as proof of viewing.

11. The method of claim 10, wherein:
decoding the media content item stream during the playback session includes decoding the multiple parts embedded in the media content item stream while decoding the sections of the media content item stream; and
extracting and accumulating the multiple parts includes extracting the multiple parts from the sections of the media content item stream upon decoding the sections of the media content item stream during the playback session.

12. The method of claim 10, wherein sending the indication indicating having accumulated the set of the multiple parts as proof of viewing includes:
constructing at least a portion of the key using the set of the multiple parts; and
reporting at least the portion of the key to indicate having accumulated the set of the multiple parts.

13. The method of claim 12, wherein constructing at least the portion of the key using the set of multiple parts includes:
applying Forward Error Correction to the set of the multiple parts to construct the key.

14. The method of claim 12, further comprising:
receiving a valid view criterion inline with the media content item stream; and
performing the constructing and the reporting upon satisfying the valid view criterion.

15. The method of claim 10, wherein the media content item stream is encrypted, and the method further includes:
decrypting the media content item stream embedded with the multiple parts of the key prior to decoding the media content item stream to obtain the multiple parts.

16. The method of claim 10, further comprising:
pairing with a device, different from the client device;
providing information to the device indicating the accumulated set of the multiple parts; and
causing the device to send an indication to a server indicating that the client device has accumulated the set of the multiple parts for obtaining a reward.

17. The method of claim 10, wherein a reward obtained upon sending the indication is associated with a non-fungible token (NFT) or a balance of digital currency corresponding to the key.

18. The method of claim 17, further comprising:
causing transferring of the NFT or the balance of digital currency to a digital wallet.

19. A device hosting a key provider, a video server, an embedder and encryptor, and a report server, the device comprising:
one or more processors;
one or more non-transitory memory; and
one or more programs stored in the one or more non-transitory memory, which, when executed by the one or more processors, cause the device to:
prepare, by the embedder and encryptor, a media content stream embedded with multiple parts of a key, including encoding the media content stream and embedding the multiple parts of the key in sections of the encoded media content stream, wherein the key provided by the key provider is associated with proof of viewing the media content item stream provided by the video server at a client device during a playback session of the media content stream;
cause, by the embedder and encryptor, the client device to decode the media content stream, including causing the client device to decode the sections in order to play the media content stream during the playback session and obtain the multiple parts of the key from the sections; and
receive, by the report server, an indication of the client device having accumulated a set of the multiple parts as proof of viewing.

20. The device of claim 19, wherein the one or more programs, which when executed by the one or more processors, further cause the device to:
encrypt, by the embedder and encryptor, the media content item stream embedded with the multiple parts of the key; and
transmit, by the embedder and encryptor, the encrypted media content item stream to the client device.

* * * * *